Jan. 26, 1971 SHIGEHISA HARADA ET AL 3,558,353

MAGNETIC RECORDING MEDIUM

Filed Aug. 23, 1967

INVENTORS
Shigehisa Harada
Terumi Kojima

BY Hill, Sherman, Meroni, Gross & Simpson ATTORNEYS

United States Patent Office 3,558,353

Patented Jan. 26, 1971

3,558,353
MAGNETIC RECORDING MEDIUM

Shigehisa Harada and Terumi Kojima, Kawasaki-shi, Japan, assignors to Nippon Columbia Kabushikikaisha (Nippon Columbia Co., Ltd.), Tokyo, Japan, a corporation of Japan Filed Aug. 23, 1967, Ser. No. 662,797
Claims priority, application Japan, Aug. 31, 1966, 41/57,393
Int. Cl. H01f 10/02
U.S. Cl. 117—235 1 Claim

ABSTRACT OF THE DISCLOSURE

A magnetic recording medium having a non-magnetic base and a magnetic paint coated thereon, the magnetic paint consisting of a powdered magnetic material, a mixture of a polyester resin having a reactive hydroxyl group and a polyurethane prepolymer including an isocyanate group reactive with the hydroxyl group and a rubber material yielding an effect corresponding to a vulcanizing effect by reaction with the materials making up the mixture.

BACKGROUND OF THE INVENTION

Field of the invention

This invention relates to a magnetic recording medium having a specific magnetic coating film deposited on the non-magnetic base thereof.

Description of the prior art

Magnetic recording media known so far encounter a problem kinetic friction factor between the media and the magnetic head, which causes abrasion of the head and lowers the travelling characteristic of the media.

SUMMARY OF THE INVENTION

The present invention deals with a magnetic recording medium having a non-magnetic base and a magnetic coating film consisting of a magnetic powder and a specific binder.

According to the magnetic recording medium of the present invention, the kinetic friction factor between the magnetic recording medium and the magnetic head scanning it becomes small to minimize the abrasion of the magnetic head and stabilize the travelling operation of the magnetic recording medium.

DECRIPTION OF PREFERRED EMBODIMENTS

In magnetic recording media such as a video signal recording tape, a data processing tape and so forth, enhancement of the adhesion, abrasion resistance and thermal resistance of the magnetic coating film and lowering of its friction factor are of prime importance and are highly required for stabilization of the travelling characteristic of the media, as compared with an audio signal recording tape and so on.

To comply with such requirements, the coating film of the aforementioned magnetic recording media is formed of a thermosetting phenol resin, epoxy resin and the like, instead of a thermoplastic vinyl chloride vinyl acetate copolymer, acrylic resin and so on, and recently polyurethanic resins have come into use for such a coating film. It is a matter of course in practice that the above materials are added with a powdered magnetic material. The polyurethanic resins are formed by the addition of polyurethane or polyurethane prepolymer to polyester resin, by which the so-called polyol compound and isocyanate compound are reacted with each other due to the coupling of a reactive hydroxyl group contained in the latter with an isocyanate group contained in the former.

With the use of urethanic resin only as in the prior art, the practical coating film becomes so hard that in video or audio signal recording or playback the kinetic friction factor $\mu$ between the coating film of the tape and the head making contact therewith considerably increases, and hence the frictional force therebetween becomes appreciably increased. This leads to unstable travelling of the tape, which introduces troubles in use and causes a remarkable increase in the abrasion of the head.

Generally speaking, it is preferred from the ideal point of view that in video or audio signal recording or playback the magnetic coating film is worn away little by little to such an extent as not to cause signal dropout to avoid abrasion of the magnetic head and hence ensures stable travelling of the magnetic recording medium.

Figure 1:
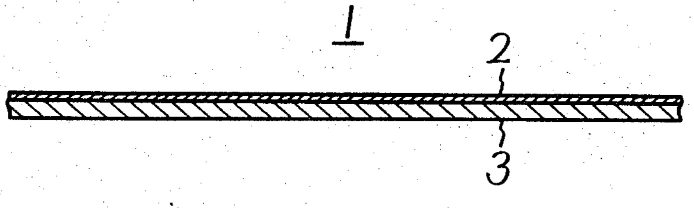
FIG. 1 is an enlarged cross-sectional view of one part of the magnetic medium according to this invention.
Figure 2:
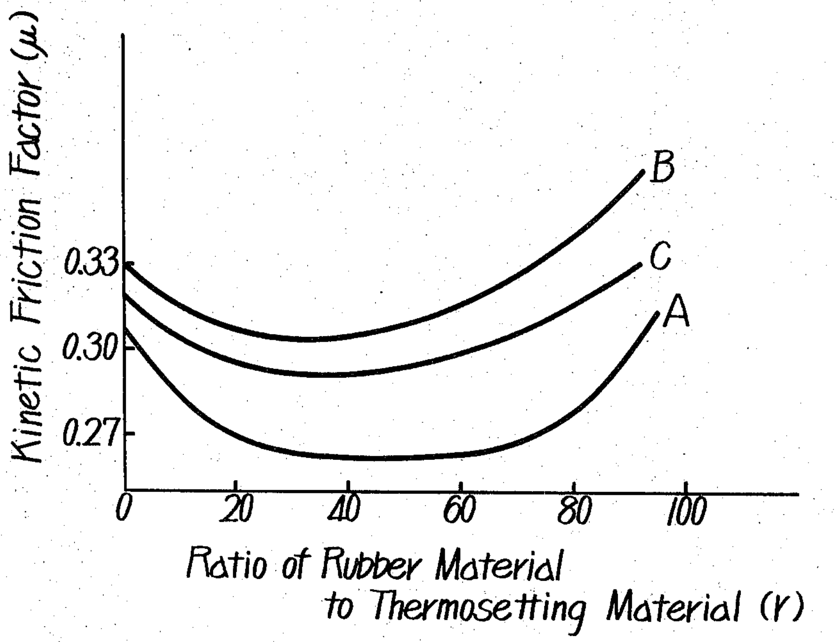
FIG. 2 is a graph illustrating the variations in the kinetic friction factor of a magnetic medium of this invention and conventional ones.

A description will be given of one example of this invention with reference to FIG. 1. A magnetic recording medium 1 of this invention is free from the aforementioned drawbacks encountered in the prior art. For this purpose, it is apparently desirable to minimize friction or the kinetic friction factor $\mu$ between the magnetic coating film laid on a tape and the head held in sliding contact therewith. In the present invention this is accomplished by the use of a novel magnetic coating film 2 which consists of a polyester resin having a reactive hydroxyl group, and a polyurethane prepolymer having an isocyanate group reactive with the hydroxyl group, a rubber material such as chloroprene rubber, nitrile rubber, styrene rubber, butadiene rubber or the like added in the ratio of about 20 to 70 percent by weight relative to the total weight of the above materials, and a powdered magnetic material. In this case, all the materials making up the magnetic coating film 2 are homogeneously mixed one another. The use of such a magnetic coating film provides excellent magnetic recording media which is free from the aforementioned drawbacks and considerably lowers the kinetic friction factor $\mu$, as compared with the conventional magnetic recording media.

In this case, the rubber material is coupled with one part of the isocyanate and hydroxyl groups to exhibit an effect corresponding to the vulcanizing effect peculiar to the rubber, which enhances the adhesion of the magnetic coating film 2 to the base 3 as well as its flexibility. The rubber material used for this purpose is required to be soluble in a solvent in which the ratio of methyl ethyl ketone to toluole is 1 to 1. In the case of using, for example, nitrile rubber, it is preferred that the percentage of acrylonitrile contained in an acrylonitrile butadiene copolymer is less than about 35 percent by weight with respect to the latter. More than about 36 percent of acrylonitrile causes the solubility of the rubber material to become poor which is undesirable in practice.

The amount of the rubber material is preferred to be approximately 20 to 70 percent by weight with respect to the total weight of the polyester resin and the polyurethane prepolymer, as has been described in the foregoing. It has been found that the use of the material thus produced and admixed with a powdered magnetic material enhances the adhesion of the magnetic coating film to the base of the tape and lowers its friction factor to stabilize the travelling characteristic of the tape.

The present invention will hereinafter be described with specific examples.

EXAMPLE I

About 200 parts by weight of $\gamma$-$Fe_2O_3$ as a magnetic powder, about 10 parts by weight of soybean lecithin or egg lecithin, about 110 parts by weight of methyl ethyl ketone and about 110 parts by weight of toluol are kneaded by means of a ball mill for approximately 24 hours to obtain a pasty mixture A. While, about 17 parts by weight of an acrylonitrile butadiene copolymer containing 26 to 30 percent by weight of nitrile is dissolved in an about 44 parts by weight of mixture solution of methyl ethyl ketone and toluol in the ratio of 1 to 1, which solution will hereinafter be referred to as a solvent and the resulting mixture is admixed with a solution of approximately 10 parts by weight of polyester resin dissolved in about 50 parts by weight of the solvent, obtaining a mixture B. The mixture B is added to the aforementioned pasty mixture A and the resulting mixture is dispersed by a ball mill for about 24 hours, obtaining a mixture C. Then, a solution D is produced which is composed of about 38 parts by weight of solution of ethyl acetate containing a polyurethane prepolymer containing 13.3 percent by weight of isocyanate group —NCO and 0.1 percent by weight of unreacted tolylene di-isocyanate TDI, and 10 parts by weight of the solvent. Following this, the solutions C and D are mixed with each other and stirred for approximately 30 to 60 minutes at shortest.

The magnetic coating film forming material thus finally produced is filtered by a wire gauge of 150 to 200 meshes, and is further filtered by a 5$\mu$ filter. The resulting magnetic coating film forming material is laid in the form of a film 2 on a polyethylene terephthalic film or base, such as the base 3, and is dried at a temperature ranging from about 80° C. to 100° C., after which the film is wound on a reel. Subsequent to this, the coated magnetic film is subjected to a surface treatment by hardening at 100° C. for 3 hours or so.

It has been found that the magnetic tape thus produced exhibits excellent adhesion, abrasion resistance, thermal resistance and stable travelling characteristic.

EXAMPLE II

About 300 parts by weight of $\gamma$-$Fe_2O_3$ as a magnetic powder, about 10 parts by weight of a dispersing agent known under the trademark of "Tenlo-70" and about 300 parts by weight of the solvent are mingled by a ball mill for approximately 24 hours so that the mixture becomes pasty. A mixture is produced by mixing about 50 parts by weight of the solvent having dissolved therein about 20 parts by weight of chloroprene rubber with a mixture of about 20 parts by weight of polyester resin and about 50 parts by weight of the solvent. Then, the mixture is added to the aforementioned pasty solution and the resulting mixture is kneaded for 24 hours or so.

Thereafter, the resulting mixture is added with about 45 parts by weight of polyurethane prepolymer (similar to that of Example I) and about 10 parts by weight of the solvent and the resulting mixture is minglingly stirred for 30 minutes at shortest. In the next stage the mixture is filtered and is then laid on the base as in the Example I. After drying and hardening processes the magnetic coating is likewise subjected to the surface treatment.

The magnetic tape thus obtained causes little abrasion of the head and is highly excellent in the travelling characteristic.

EXAMPLE III

About 300 parts by weight of $\gamma$-$Fe_2O_3$ as a magnetic powder, about 5 parts by weight of lead stearate and about 5 parts by weight of carbon black are added with a mixture solution of about 35 parts by weight of styrene rubber, about 100 parts by weight of the solvent, about 25 parts by weight of polyester resin and about 75 parts by weight of the solvent, and the resulting mixture is mingled by stirring. Thereafter, the mixture is kneaded by a preheated kneading roll until almost all the solvent disperses and the mixture takes the shape of a sheet. After cooled, the sheet is severed and is then dissolved with the solvent of approximately 1.5 times heavier than the total weight of the mixture and about 5 parts by weight of lecithin. This solution is subjected to a dispersing process by a ball mill for approximately 24 hours and is then added with about 40 parts by weight of polyurethane prepolymer (similar to that of the Example I) and about 10 parts by weight of the solvent, thereafter being dispersed again by stirring for about 30 minutes to 2 hours.

The final mixture is subjected to similar processes to those in the Examples I and II to produce a magnetic tape.

The accompanying sheet of drawing is a graph illustrating the relationship between the kinetic friction factors $\mu$ of the magnetic tapes and the ratios $r$ of the content of the rubber material contained in the magnetic paint for the coating, the ordinate representing the former and the abscissa the latter, in which a curve A indicates a magnetic tape of this invention and curves B and C conventional ones using phenol resin and epoxy resin respectively.

It appears from this graph that the addition of the rubber material to the urethane resin in the ratio of about 20 to 70 percent by weight relative to the latter as in the case of the tape A minimizes the kinetic friction factor $\mu$ and hence appreciably stabilizes the travelling characteristic of the tape, as compared with the cases of the conventional tapes B and C.

It will be apparent that many modifications and variations may be effected without departing from the scope of the novel concepts of this invention.

We claim as our invention:

1. A magnetic recording medium comprising a non-magnetic base having a magnetic coating composition thereon, said coating composition comprising a substantially homogeneous mixture consisting essentially of a magnetic powder, a reaction product of (1) a polyester resin having a reactive hydroxyl group and (2) a polyurethane prepolymer having an isocyanate group reactive with said reactive hydroxyl group, said reaction product of (1) and (2) being present as a result of the reaction between a part of said hydroxyl and said isocyanate groups to leave some of said groups free for further reaction, and a synthetic rubber material coupled through said some of said groups free for further reaction, said rubber material being initially present in a proportion of from 20 to 70% by weight of the total weight of said polyester resin and said polyurethane prepolymer, the resulting magnetic coating composition having a lower kinetic friction factor as a result of the inclusion of said rubber material.

References Cited

UNITED STATES PATENTS

| | | | |
|---|---|---|---|
| 3,139,354 | 6/1964 | Wolff | 117—235 |
| 3,144,353 | 8/1964 | Hargis et al. | 117—235 |
| 3,149,996 | 9/1964 | Wagner et al. | 117—235 |
| 3,357,855 | 12/1967 | Heinrich et al. | 117—235 |
| 3,387,995 | 6/1968 | Senkpiel et al. | 117—235UX |
| 3,427,191 | 2/1969 | Howell et al. | 117—235UX |
| 3,437,510 | 4/1969 | Diaz | 252—62.54 |

WILLIAM D. MARTIN, Primary Examiner

B. D. PIANALTO, Assistant Examiner

U.S. Cl. X.R.

117—161, 237; 252—62.54